United States Patent
Chapman (10) Patent No.: US 10,431,988 B2
(45) Date of Patent: Oct. 1, 2019

(54) ALTERNATIVE SOURCE MODULE ARRAY CHARACTERIZATION

(71) Applicant: Enphase Energy, Inc., Petaluma, CA (US)

(72) Inventor: Patrick Chapman, Austin, TX (US)

(73) Assignee: Enphase Energy, Inc., Petaluma, CA (US)

( * ) Notice: Subject to any disclaimer, the term of this patent is extended or adjusted under 35 U.S.C. 154(b) by 52 days.

(21) Appl. No.: 15/886,352

(22) Filed: Feb. 1, 2018

(65) Prior Publication Data

US 2018/0159333 A1    Jun. 7, 2018

Related U.S. Application Data

(63) Continuation of application No. 14/720,445, filed on May 22, 2015, now Pat. No. 9,906,036.

(60) Provisional application No. 62/002,885, filed on May 25, 2014.

(51) Int. Cl.
   *H02J 3/38* (2006.01)
   *H02M 7/44* (2006.01)
   *G08C 19/02* (2006.01)

(52) U.S. Cl.
   CPC .............. *H02J 3/383* (2013.01); *G08C 19/02* (2013.01); *H02M 7/44* (2013.01); *Y02E 10/563* (2013.01); *Y10T 307/707* (2015.04)

(58) Field of Classification Search
   CPC ......... H02J 3/383; H02M 7/44; Y02E 10/563; Y10T 307/707; G08C 19/02
   See application file for complete search history.

(56) References Cited

U.S. PATENT DOCUMENTS

| | | | |
|---|---|---|---|
| 8,666,561 B2 | 3/2014 | Fornage et al. | |
| 8,686,333 B2* | 4/2014 | Arditi | H02J 1/102 136/244 |
| 2010/0156192 A1* | 6/2010 | Wang | H02J 3/01 307/82 |
| 2011/0172842 A1 | 7/2011 | Makhota | |

(Continued)

FOREIGN PATENT DOCUMENTS

| | | |
|---|---|---|
| CN | 102158129 A | 8/2011 |
| CN | 103475019 A | 12/2013 |

(Continued)

OTHER PUBLICATIONS

EP Application No. 15800118.0-1804 dated Feb. 22, 2017, European Search Report, 7 pages.

(Continued)

*Primary Examiner* — Jared Fureman
*Assistant Examiner* — Duc M Pham
(74) *Attorney, Agent, or Firm* — Moser Taboada (57) ABSTRACT

A system and method for mapping relative positions of a plurality of alternative energy source modules. In one embodiment, the method includes injecting a first contribution current into a power grid by a first alternative energy source module of the plurality of alternative energy source modules and determining an output voltage for each of the plurality of alternative energy source modules. The method also includes constructing a data structure of the relative positions of the plurality of alternative energy source modules employing the output voltage for ones of the plurality of alternative energy source modules.

20 Claims, 8 Drawing Sheets

(56) References Cited

U.S. PATENT DOCUMENTS

| | | |
|---|---|---|
| 2012/0158197 A1 | 6/2012 | Hinman et al. |
| 2012/0275196 A1 | 11/2012 | Chapman et al. |
| 2012/0306515 A1* | 12/2012 | Barnes .................... H02J 3/383 |
| | | 324/707 |
| 2013/0204556 A1* | 8/2013 | Sun .......................... H02J 3/06 |
| | | 702/60 |
| 2013/0285457 A1 | 10/2013 | Kepley |
| 2014/0139031 A1 | 5/2014 | Seymour et al. |
| 2015/0028682 A1* | 1/2015 | Jean .......................... H02J 1/00 |
| | | 307/80 |
| 2015/0340868 A1 | 11/2015 | Chapman |
| 2015/0357820 A1* | 12/2015 | Sugimoto ............. H01M 10/44 |
| | | 307/52 |

FOREIGN PATENT DOCUMENTS

| | | |
|---|---|---|
| EP | 2725372 A1 | 4/2014 |
| JP | 2000217259 A | 8/2008 |
| KR | 20130079015 A | 7/2013 |
| WO | 2008144540 A1 | 11/2008 |
| WO | WO-2009134756 A1 | 11/2009 |
| WO | WO-2012166933 A1 | 12/2012 |
| WO | 2015183751 A1 | 3/2015 |

OTHER PUBLICATIONS

PCT/US2015/032281 International Search Report, dated Aug. 27, 2015, 3 pages.

\* cited by examiner

ALTERNATIVE SOURCE MODULE ARRAY CHARACTERIZATION

This application is a Continuation of U.S. patent application Ser. No. 14/720,445 entitled "Alternative Source Module Array Characterization", filed on May 22, 2015 and published as U.S. Patent Publication No. 2015/0340868 dated Nov. 26, 2015 which claims the benefit of U.S. Provisional Application Ser. No. 62/002,885 entitled "Inverter Array Characterization," filed May 25, 2014, which is incorporated herein by reference.

BACKGROUND

Power inverters convert a direct current ("DC") power to an alternating current ("AC") power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbines, DC water turbines, and other DC power sources, to single-phase AC power for delivery to an AC grid at a grid frequency.

In an effort to increase the amount of AC power generated, a large number of power inverters may be used in a particular application. In some implementations, each power inverter is incorporated or otherwise associated with an alternative energy source to form an alternative energy source module. Such modules are typically located in remote or otherwise difficult to reach locations (e.g., a solar cell panel located on a roof).

A particular kind of an alternative energy source module is known as an alternating current photovoltaic ("ACPV") module. An ACPV module includes at least a solar module (that produces DC power in response to sunlight), and an inverter that converts the DC power from the solar module to power grid compatible AC power. Such an inverter may be known as a microinverter.

When an array of at least two ACPV modules is installed on a roof, the array may be difficult to access at a later date for purposes of repair, maintenance, or augmentation of the array. An identifying mark, such as a serial number, will normally be associated with each ACPV module. Once the array has been installed, the identifying marks will generally not be visible or easily accessible.

BRIEF DESCRIPTION OF THE DRAWINGS

The concepts described herein are illustrated by way of example and not by way of limitation in the accompanying FIGUREs. For simplicity and clarity of illustration, elements illustrated in the FIGUREs are not necessarily drawn to scale. Where considered appropriate, reference labels have been repeated among the FIGUREs to indicate corresponding or analogous elements.

Corresponding numerals and symbols in the different figures generally refer to corresponding parts unless otherwise indicated. The figures are drawn to clearly illustrate the relevant aspects of the preferred embodiments and are not necessarily drawn to scale

DETAILED DESCRIPTION OF ILLUSTRATIVE EMBODIMENTS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to engage such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative FIGUREs. Additionally, the inclusion of a structural or method feature in a particular FIGURE is not meant to imply that such feature is required in all embodiments and, in some embodiments, may not be included or may be combined with other features.

Figure 1:
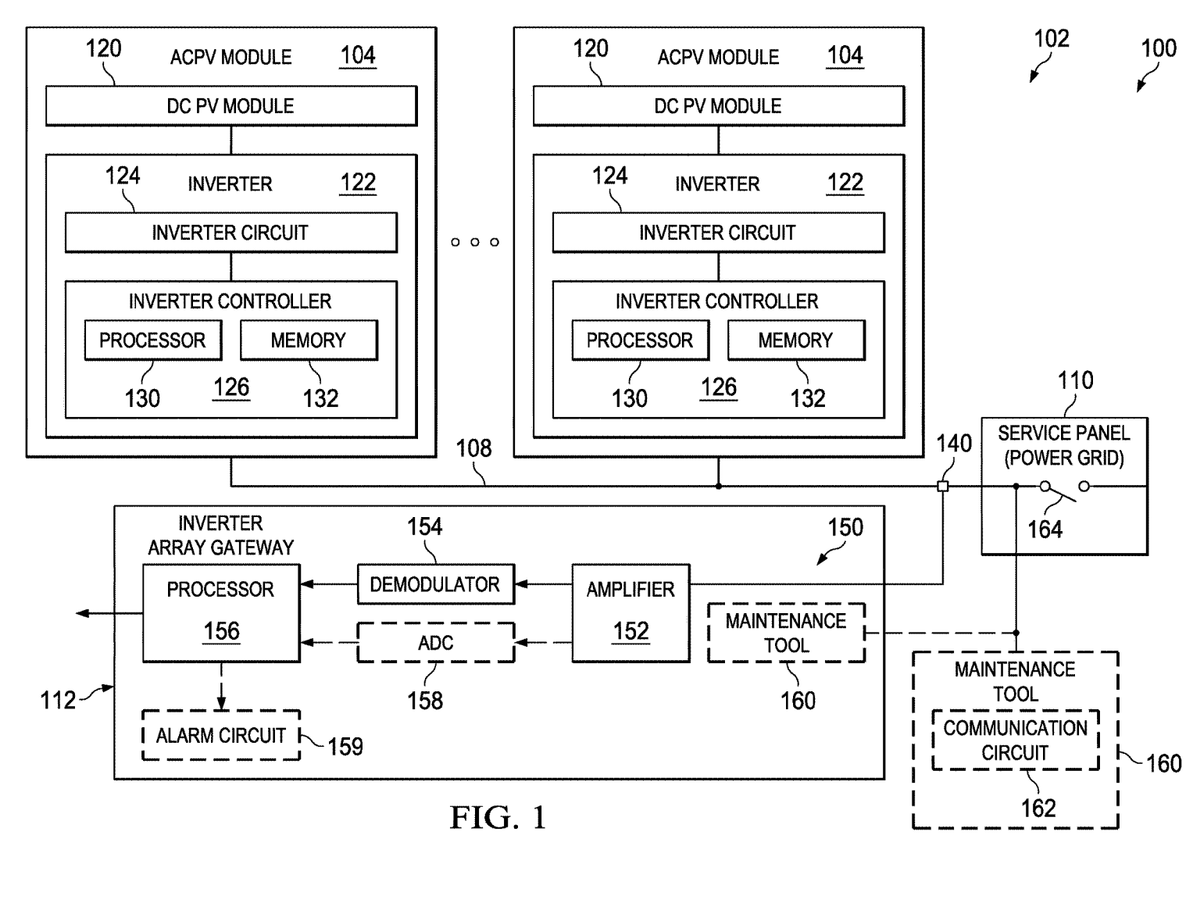
FIG. 1 illustrates a simplified block diagram of an embodiment of a system for generating alternative energy.

Turning now to FIG. 1, illustrated is a simplified block diagram of an embodiment of a system 100 for generating alternative energy. The system 100 may include an array 102 of alternative energy source modules (designated "ACPV module") 104 and an inverter array gateway 112 electrically coupled to each of the alternative energy source modules 104 via a conductor such as an alternating current ("AC") power line cable 108. The alternative energy source modules 104 may be configured to convert direct current ("DC") power from an alternative energy source (e.g., a photovoltaic module) to AC power, which is supplied to a power grid via a service panel 110 via the AC power line cable 108. In the illustrative embodiment, the alternative energy source modules 104 are embodied as photovoltaic modules configured to convert solar energy to AC power. However, in other embodiments, other types of alternative energy sources may be used such as, for example, fuel cells, DC wind turbines, DC water turbines, and/or other alternative energy sources. Additionally, although the illustrative array 102 includes two alternative energy source modules 104, the array 102 may include more or fewer alternative energy source modules 104 in other embodiments.

The illustrative system 100 also includes the inverter array gateway 112, which provides a communication portal to the array 102. In use, each of the alternative energy source modules 104 is configured to communicate with the inverter array gateway 112 and/or other devices via the inverter array gateway 112. To do so, as discussed in more detail below, the alternative energy source modules 104 may modulate information to be transmitted on to an output waveform, which may be an AC waveform, generated by each alternative energy source module 104. Such modulation may include modulating information on to a modulation signal and/or a carrier signal of the output waveform as discussed below. It should be appreciated that because the output waveform of the alternative energy source modules 104 is used for such communications, additional communication circuitry (e.g., a power line carrier communication circuit) is not required in the alternative energy source modules 104.

As discussed above, in the illustrative embodiment, the alternative energy source modules 104 may be embodied as photovoltaic modules coupled to or including solar panels. As such, each of the alternative energy source modules 104 may include a DC photovoltaic module (designated "DC PV module") 120 and an inverter 122. The DC photovoltaic module 120 may be embodied as one or more photovoltaic cells and is configured to deliver DC power to the inverter 122 in response to receiving an amount of sunlight. Of course, the DC power delivered by the DC photovoltaic module 120 is a function of environmental variables such as, without limitation, sunlight intensity, sunlight angle of incidence and temperature. The inverter 122 is configured to convert the DC power generated by the DC photovoltaic module 120 to AC power. In some embodiments, the inverter 122 and the DC photovoltaic module 120 are located in a common housing. Alternatively, the inverter 122 may include its own housing secured to the housing of the DC photovoltaic module 120. Additionally, in some embodiments, the inverter 122 is separate from the housing of the DC photovoltaic module 120, but located nearby.

Each of the illustrative inverters 122 may include a DC-to-AC inverter circuit (designated "inverter circuit") 124 and an inverter controller 126. The DC-to-AC inverter circuit 124 may be configured to convert the DC power generated by the DC photovoltaic module 120 to AC power at the power grid frequency. The operation of the inverter 122 may be controlled and monitored by the inverter controller 126. The illustrative inverter controller 126 includes a processor 130 and a memory 132. Additionally, the inverter controller 126 may include other devices commonly found in controllers which are not illustrated in FIG. 1 for clarity of description. Such additional devices may include, for example, peripheral devices, data storage devices, input/output ports, and/or other devices.

The processor 130 of the inverter controller 126 may be embodied as any type of processor capable of performing the functions described herein including, but not limited to, a microprocessor, digital signal processor, microcontroller, or the like. The processor 130 is illustratively embodied as a single core processor, but may be embodied as a multi-core processor having multiple processor cores in other embodiments. Additionally, the inverter controller 126 may include additional processors having one or more processor cores in other embodiments.

The memory 132 of the inverter controller 126 may be embodied as one or more memory devices or data storage locations including, for example, dynamic random access memory devices ("DRAM"), synchronous dynamic random access memory devices ("SDRAM"), double-data rate synchronous dynamic random access memory device ("DDR SDRAM"), flash memory devices, and/or other volatile memory devices. The memory 132 is communicatively coupled to the processor 130 via a number of signal paths, such as a data bus, point-to-point connections, or other interconnects. Although only a single memory 132 is illustrated in FIG. 1, in other embodiments, the inverter controller 126 may include additional memory.

The inverter array gateway 112 may include a demodulation circuit 150 configured to demodulate the information transmitted by the alternative energy source modules 104 over the AC power line cable 108. In the illustrative embodiment, the demodulation circuit 150 may include an amplifier 152, that may receive a sensor signal from a current sensor 140 coupled to the AC power line cable 108. The amplifier 152 may amplify and condition the sensor signal, which may be provided to a demodulator 154. The demodulator 154 may demodulate information from the sensor signal and provide the demodulated information to a processor 156, which may subsequently save the information in local or remote data storage, transmit the information to a remote device (e.g., a remote monitor computer), generate local or remote alarms (via an alarm circuit 159), or take some other action in response to the information. The processor 156 may be embodied as any type of processor capable of performing the functions described herein including, but not limited to, a microprocessor, digital signal processor, microcontroller, or the like. Depending on the type of modulation used by the alternative energy source modules 104, the demodulation circuit 150 may include an analog-to-digital converter (designated "ADC") 158 in addition to, or in place of, the demodulator 154. Regardless, each of the demodulators 154 and the analog-to-digital converters 158 are configured to supply the demodulated information to the processor 156. As will become more apparent, the inverter array gateway 112 can selectively enable or disable the alternative energy source modules 104, organize measured data therefrom into data structures (e.g., position tables), and communicate the resulting tables remotely (via a wired or wireless connection) to, without limitation, a mobile phone or a computer of a user.

In some embodiments, the system 100 may also include a maintenance tool 160, which may be utilized by an installer or repairer of the alternative energy source modules 104. Similar to the inverter array gateway 112, the maintenance tool 160 is configured to communicate with the alternative energy source modules 104. However, when the maintenance tool 160 is coupled to the AC power line cable 108, a switch 164 of the service panel 110 may be opened to decouple the array 102 from the power grid. In such embodiments, the alternative energy source modules 104 may discontinue generation of AC output power (e.g., by detecting an islanding condition). As such, the maintenance tool 160 and the alternative energy source modules 104 may utilize the AC power line cable 108 solely for communication purposes (i.e., not for delivery of power as normal) while the array 102 is disconnected from the power grid. In such circumstances, a communication protocol of higher bandwidth, relative to communication techniques using the AC power line cable 108 while AC output power is begin supplied, may be used (e.g., a Modbus protocol). The maintenance tool 160 may include a communication circuit 162 to support such "off-line" communications with the alternative energy source modules 104. As illustrated, the maintenance tool 160 may be located within or outside of the inverter array gateway 112.

Figure 2:
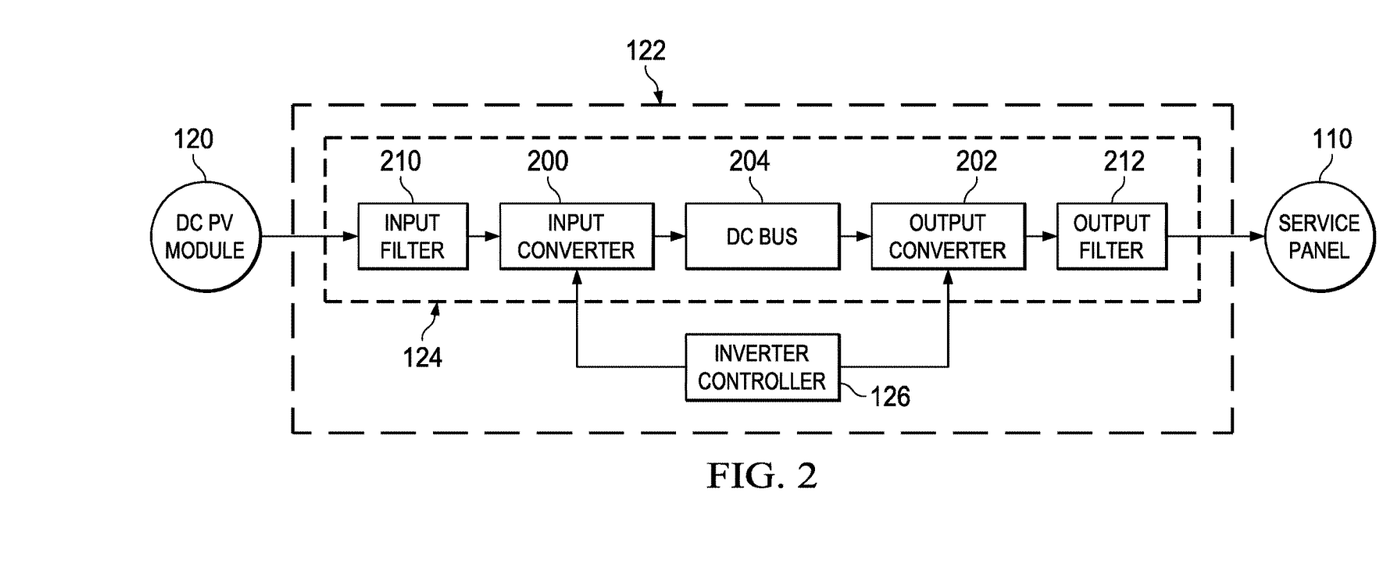
FIG. 2 illustrates a simplified block diagram of an embodiment of the inverter of the system of FIG. 1.

Turning now to FIG. 2, illustrated is a simplified block diagram of an embodiment of an inverter 122 of the system 100 of FIG. 1. In the simplified block diagram illustrated in FIG. 2, the inverter circuit 124 of the inverter 122 may include an input converter 200 electrically coupled to a DC bus 204 and an output converter 202 with an input electrically coupled to the DC bus 204. Additionally, in some embodiments, the inverter circuit 124 may also include an input filter 210 electrically coupled to the input converter 200 and the DC photovoltaic module 120 and an output filter 212 electrically coupled to the output converter 202 and the service panel 110.

In the illustrative embodiment, the input converter 200 may be embodied as a DC-to-DC converter configured to convert low voltage DC power to high voltage DC power. That is, the input converter 200 converts the DC power received from the DC photovoltaic module 120 to a high level DC voltage power, which is supplied to the DC bus 204. The output converter 202 may be embodied as a DC-to-AC converter configured to convert the high voltage DC power from the DC bus 204 to AC power, which is supplied to the service panel 110, and thereby the power grid at the grid frequency.

The inverter controller 126 may be electrically coupled to the input converter 200 and configured to control the operation of the input converter 200 to convert the low voltage DC power received from the DC photovoltaic module 120 to the high voltage DC power supplied to the DC bus 204. Additionally, in some embodiments, the inverter controller 126 may control the operation of the input converter 200 based on a maximum power point tracking ("MPPT") algorithm or methodology. To do so, the inverter controller 126 may provide a plurality of control signals to various circuits of the input converter 200.

The inverter controller 126 may also be electrically coupled to the output converter 202 and configured to control operation of the output converter 202 to convert the DC power of the DC bus 204 to AC power suitable for delivery to the power grid via the service panel 110. Additionally, as discussed in more detail below, the inverter controller 126 may be configured to control the operation of the output converter 202 so as to provide a test signal via an output waveform of the inverter circuit 124. In particular, the inverter controller 126 may generate switch signals to control the operation of a plurality of switches of the output converter 202 to provide a test current (a contribution current) to the power grid via the service panel 110.

Figure 3:
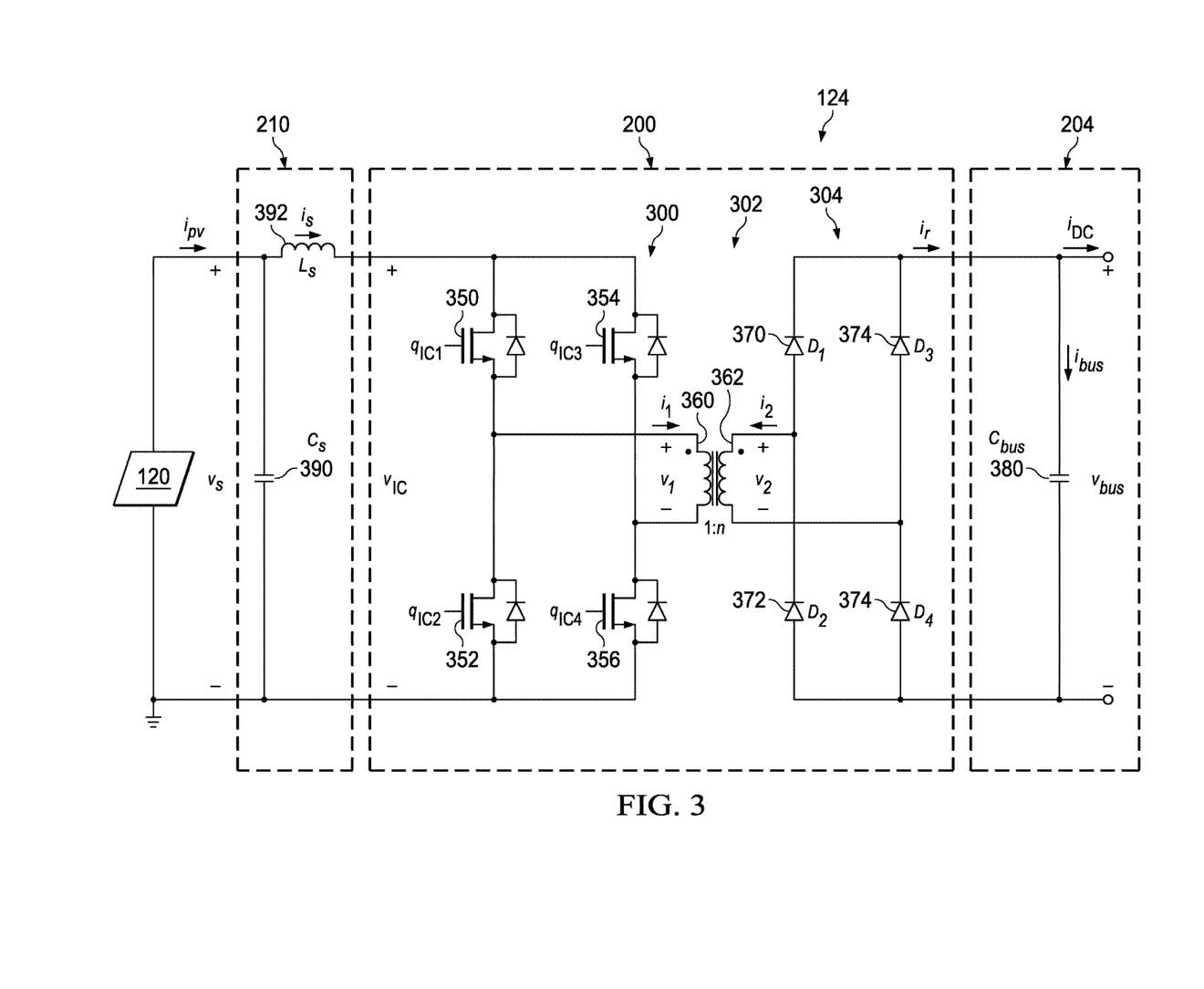
FIGS. 3 and 4 illustrate simplified circuit diagrams of an embodiment of the inverter circuit of FIG. 2.
Figure 4:
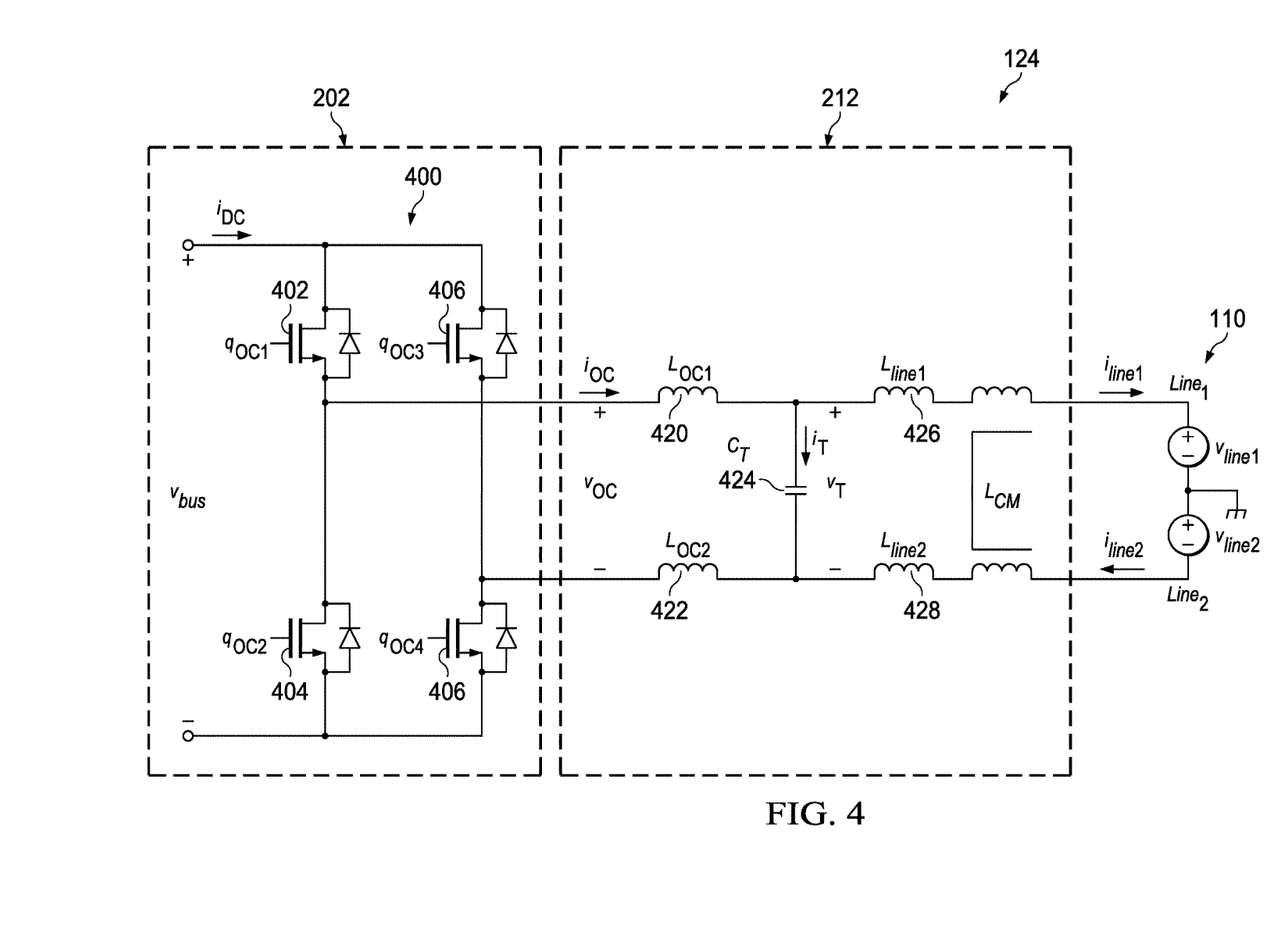

Turning now to FIGS. 3 and 4, illustrated are simplified circuit diagrams of an embodiment of the inverter circuit 124 of FIG. 2. Beginning with FIG. 3, the input converter 200 may include an inverter circuit 300, a transformer 302, and a rectifier circuit 304. The inverter circuit 300 may be embodied as a DC-to-AC inverter circuit configured to convert the DC waveform supplied by the DC photovoltaic module 120, via the input filter 210, to an AC waveform delivered to a primary winding 360 of the transformer 302. For example, the inverter circuit 300 may be illustratively embodied as a bridge circuit formed by a plurality of switches 350, 352, 354, 356. Each of the switches 350, 352, 354, 356 may be configured to receive a corresponding control signal $q_{IC1}$, $q_{IC2}$, $q_{IC3}$, $q_{IC4}$, from the inverter controller 126 (illustrated in FIG. 2) to control an operation of the inverter circuit 300. The inverter controller 126 may use pulse-width modulation ("PWM") to control the switches 350, 352, 354, 356 at a relatively high switching frequency (e.g., at a frequency such as, without limitation, 100 kilohertz ("kHz") that is substantially higher than the AC grid frequency, which is typically 50 or 60 hertz ("Hz")). As discussed above, the input converter 200 converts the DC waveform from the DC photovoltaic module 120 to a first AC waveform based on control signals received from the inverter controller 126. In the illustrative embodiment, the inverter circuit 300 may be embodied as a full-bridge circuit, but other circuit topologies such as a half-bridge circuit may be used in other embodiments. Additionally, although each of the switches 350, 352, 354, 356 is illustrated as metal-oxide semiconductor filed-effect transistor ("MOSFET") devices, other types of switches can be used in other embodiments.

The transformer 302 may be embodied as a two or more winding transformer having the primary winding 360 electrically coupled to the inverter circuit 300 and a secondary winding 362 coupled to the rectifier circuit 304. The transformer 302 may be configured to convert the first AC waveform supplied by the inverter circuit 300 at the primary winding 360 to a second AC waveform at the secondary winding 362. The first and second AC waveforms may have substantially equal frequencies and may or may not have substantially equal voltages. The illustrative transformer 302 includes the primary winding 360 electrically coupled to the inverter circuit 300 and the secondary winding 362 electrically coupled to the rectifier circuit 304. The transformer 302 may provide galvanic isolation between the primary side circuitry (including DC photovoltaic module 120) and the secondary side circuitry (including the DC bus 204). The turns ratio of the transformer 302 may also provide voltage and current transformation between the first AC waveform at the primary winding 360 and the second AC waveform at the secondary winding 362.

The rectifier circuit 304 may be electrically coupled to the secondary winding 362 of the transformer 302 and configured to rectify the second AC waveform to a DC waveform supplied to the DC bus 204. In the illustrative embodiment, the rectifier circuit 304 may be embodied as a full-bridge rectifier formed from a plurality of diodes 370, 372, 374, 376. Again, in other embodiments, other circuit topologies and other components such as synchronous rectifiers may be used in the rectifier circuit 304.

The DC bus 204 may be coupled to the rectifier circuit 304 of the input converter 200 and to the output converter 202. The DC bus 204 may be configured to store energy from the input converter 200 and transfer energy to the output converter 202 as needed. To do so, the DC bus 204 may be maintained at a high voltage DC value relative to DC voltage values produced by the DC photovoltaic module 120 and may include a DC bus capacitor 380. The particular value of capacitance of the DC bus capacitor 380 is dependent on the particular parameters of the inverter circuit 124 such as the desired voltage level of the DC bus 204, the expected requirements of the power grid, and/or the like.

As shown in FIG. 4, the output converter 202 may be electrically coupled to the DC bus 204 and configured to convert the DC bus waveform to the output AC waveform, which is filtered by the output filter 212. The output converter 202 may include a DC-to-AC inverter circuit 400 configured to convert the DC waveform supplied by the DC bus 204 to an AC waveform delivered to the output filter 212. For example, the inverter circuit 400 may illustratively be embodied as a bridge circuit formed by a plurality of switches 402, 404, 406, 408. Each of the switches 402, 404, 406, 408 may be configured to receive a corresponding control signal $q_{OC1}$, $q_{OC2}$, $q_{OC3}$, $q_{OC4}$, from the inverter controller 126 to control operation of the output converter 202. As discussed above, the inverter controller 126 may use PWM to control the switches 402, 404, 406, 408 to generate a pulse width modulated AC waveform. Again, it should be appreciated that although the illustrative output converter 202 is embodied as a full-bridge circuit, other circuit topologies such as a half-bridge circuit may be used in other embodiments. Additionally, although each of the switches 402, 404, 406, 408 is illustrated as a MOSFET device, other types of switches may be used in other embodiments.

The input filter 210 and output filter 212 may be configured to provide filtering functions of the DC input waveform from the DC photovoltaic module 120 and the AC output waveform to the power grid, respectively. The input filter 210 illustratively includes a filtering capacitor 390 and a filtering inductor 392. However, other filtering components and topologies may be used in other embodiments. The output filter 212 may be configured to filter the output voltage by reducing the conducted interference and satisfying regulatory requirements. In the illustrative embodiment, the output filter 212 may include differential-mode inductors 420, 422, a line filter capacitor 424, and common-mode inductors 426, 428. Again, however, other filtering component and topologies may be used in other embodiments.

Figure 5:
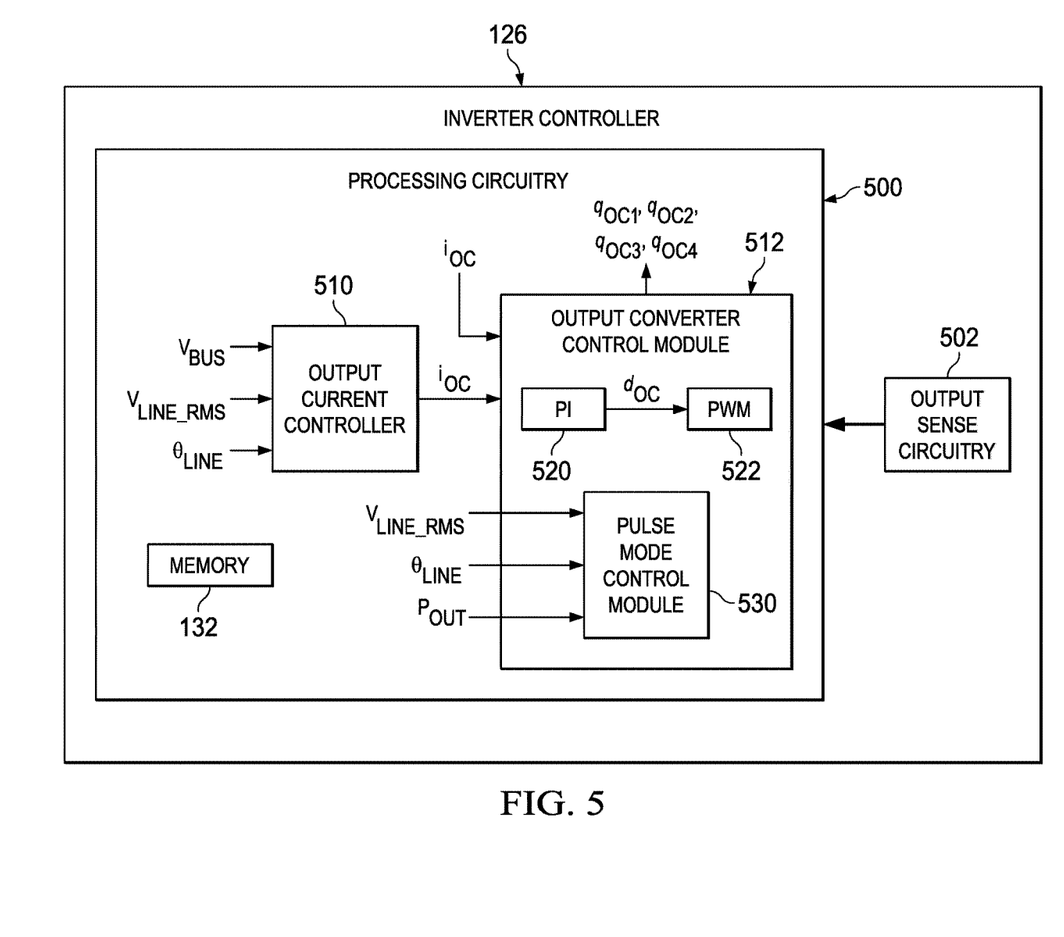
FIG. 5 illustrates a simplified block diagram of an embodiment of the inverter controller of the inverter of FIG. 2.

Turning now to FIG. 5, illustrated is a simplified block diagram of an embodiment of the inverter controller 126 of the inverter 122 of FIG. 2. The inverter controller 126 may include various control modules to control the operation of the input converter 200 and the output converter 202. With specific regard to the control of the output converter 202, the inverter controller 126 may include processing circuitry 500 and output sense circuitry 502, which provides various sensed signals to the processing circuitry 500. The processing circuitry 500 may be embodied in, or otherwise include, the processor 130 and/or the memory 132 of the inverter controller 126 (see FIG. 1), as well as additional circuitry and/or devices. The output sense circuitry 502 may include a plurality of sensing circuits to sense various currents and voltages of the inverter 122 and/or power grid. In the illustrative embodiment, the output sense circuitry 502 may be configured to sense or calculate the local power grid line voltage $V_{LINE}RMS$, the local grid phase (or phase angle of the local grid voltage) $\theta_{LINE}$, and the output power $P_{OUT}$ associated with the inverter 122. However, in other embodiments, additional or other currents, voltages, and/or circuit characteristics may be sensed or otherwise measured by the output sense circuitry 502.

The processing circuitry 500 may include a plurality of control modules, which may be embodied as firmware/ software programs (e.g., stored in the memory 132), discrete hardware circuitry, and/or a combination of hardware and software. In the illustrative embodiment, the processing circuitry 500 may include an output current controller 510 and an output converter control module 512. Of course, it should be appreciated that additional or other modules, functionality, and features may be included in the processing circuitry 500 depending on the particular implementation. Additionally, it should be appreciated that although the output current controller 510 and the output converter control module 512 are illustrated in FIG. 5 as separate modules, the functionality of any one or more thereof may be incorporated into another module of the processing circuitry 500.

The output current controller 510 may be configured to generate command signals as a function of a plurality of other signals and/or characteristics of the inverter 122. For example, in the illustrative embodiment, the output current controller 510 may generate a current command signal $i_{OC}*$ as a function of a bus voltage $V_{BUS}$ (see FIG. 3) of the DC power bus 204, the local power grid line voltage $V_{LINE\_RMS}$, and the local grid phase $\theta_{LINE}$. Of course, in other embodiments, the output current controller 510 may generate the current command signal $i_{OC}*$ based on additional or other signals of the inverter 122. Additionally, although the command signal may be embodied as a current command signal $i_{OC}*$ in FIG. 5, the command signal may be embodied as a voltage command signal, a duty cycle command signal, or another type of command signal in other embodiments.

The output converter control module 512 may be configured to control the operation of the output converter 202. To do so, the output converter control module 512 may be configured to generate the control signals $q_{OC1}$, $q_{OC2}$, $q_{OC3}$, $q_{OC4}$ that control the operation of the switches 402, 404, 406, 408 of the output converter 202. In the illustrative embodiment, the output converter control module 512 may include a proportional-integral module (designated "PI") 520 configured to generate a duty cycle command signal $d_{OC}$ based on the current command signal $i_{OC}*$ and a feedback signal of an output current $i_{OC}$ of the inverter 122. The duty cycle command signal doc may be provided to a pulse width modulation control module (designated "PWM") 522, which generates the control signals $q_{OC1}$, $q_{OC2}$, $q_{OC3}$, $q_{OC4}$ based on the duty cycle command signal $d_{OC}$. The output converter control module 512 may also include a pulse mode control module 530 configured to generate the control signals $q_{OC1}$, $q_{OC2}$, $q_{OC3}$, $q_{OC4}$ that control the operation of the switches 402, 404, 406, 408 when the output converter 202 operates in a pulse mode of operation. For a better understanding of an operation associated with the pulse mode control module 530, see U.S. Pat. No. 8,284,574 entitled "Method and Apparatus for Controlling an Inverter using Pulse Mode Control," to Chapman, et al., issued Oct. 9, 2012, which is incorporated herein by reference. The output converter control module 512 may also perform various safety and/or quality verification checks on the inverter 122 such as ensuring that the output power remains within an acceptable range, protecting against anti-islanding conditions, and/or other functions.

Figure 6:
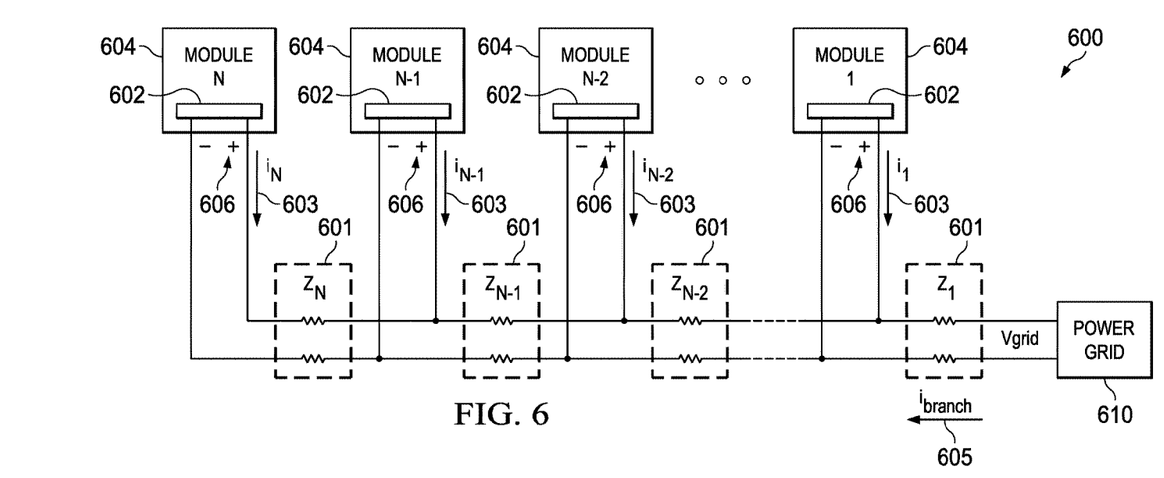
FIG. 6 illustrates a simplified block diagram of an embodiment of a branch circuit including a plurality of alternative energy source modules.

Turning now to FIG. 6, illustrated is a simplified block diagram of an embodiment of a branch circuit (or an array) 600 including a plurality of alternative energy source modules 604, numbered consecutively from 1 to N, that are connected via cable impedances 601, also numbered consecutively from $Z_1$ to $Z_N$. The cable impedances 601 are depicted as resistances, but one of ordinary skill in the art would understand that the cable impedances 601 could also include inductances and capacitances. However, at the frequency of a power grid 610, which is approximately 60 Hz in the United States, resistances would likely dominate the impedances. The power grid 610 provides a grid voltage Vgrid and may include grid interconnection equipment such as a service panel, a disconnect switch, surge protection, and power meters. The alternative energy source modules 604 may also contain module impedances 602. The module impedances 602 are typically very high at 60 Hz, being much larger than the cable impedances 601, and are typically dominated by the capacitances of "X capacitors" and/or "Y capacitors," which are often used to reduce conducted emissions that may produce electromagnetic interference.

Each alternative energy source module 604 may provide a contribution current 603, also designated $i_1$ to $i_N$, to a cable network including the cable impedances 601. The contribution currents 603 sum to provide a branch current (designated "$i_{branch}$") 605. The contribution currents 603 and the branch current 605 are typically alternating currents that may or may not have a phase shift relative to the grid voltage Vgrid of the power grid 610. However, according to standards such as IEEE 1547, which is incorporated herein by reference, the power factor of each alternative energy source module 604 may be unity, meaning that the contribution currents 603 (and therefore the branch current 605) are in phase with the grid voltage Vgrid of the power grid 610. As such, reading FIG. 6 from left to right, the peak or root mean square ("RMS") values of the contribution currents 603 may be simply additive and accumulate as follows. The leftmost cable impedance 601 would conduct only $i_N$. The next-to-leftmost cable impedance 601 would conduct $i_N + i_{N-1}$. Likewise, the third-from-leftmost cable impedance 601 would conduct $i_N + i_{N-1} + i_{N-2}$, and so on.

Each cable impedance 601 in combination with its conducted current may contribute a voltage drop according to Ohm's Law. The alternative energy source modules 604 may have corresponding terminal voltages 606, also referred to as V1 through VN (wherein V1 and VN refer to terminal voltages for the first and Nth alternative energy source modules 604, respectively). For example, the terminal voltage V1 can be calculated as V1=Vgrid+$(i_1+i_2+\ldots+i_N)\cdot Z_1$. Assuming the contribution currents 603 are positive or zero (that is, in phase with the grid voltage Vgrid), the terminal voltage V1 may be greater than or equal to the grid voltage Vgrid of the power grid 610. Likewise, the terminal voltage V2 can be calculated as V2=V1+$(i_2+i_3+\ldots+i_N) Z_2$, wherein V2, $i_2$ and $Z_2$ represent a terminal voltage, a contribution current and a cable impedance, respectively, of a second alternative energy source module 604. As such, the terminal voltages relate according to V2≥V1. Likewise, all the terminal voltages V1 through VN may be similarly calculated and the terminal voltages relate according to VN≥VN−1≥...≥V1≥Vgrid. As such, the relative terminal voltages V1 through VN can be used to indicate the relative position of a particular alternative energy source module 604 in the branch circuit 600.

Note that the cable impedances 601 may or may not be equal, although in systems connected with prefabricated cables, the impedances $Z_2$ through $Z_N$ may be approximately equal. In that case, the impedance $Z_1$ may include the prefabricated cable impedance as well as the impedance of potentially lengthy wires that connect the branch circuit 600 to the power grid 610. This potentially lengthy connection is sometimes referred to as a "whip cable." As such, the impedance $Z_1$ is not only the highest impedance, but it also conducts the full branch current 605 and, therefore, has the largest voltage drop.

Figure 7:
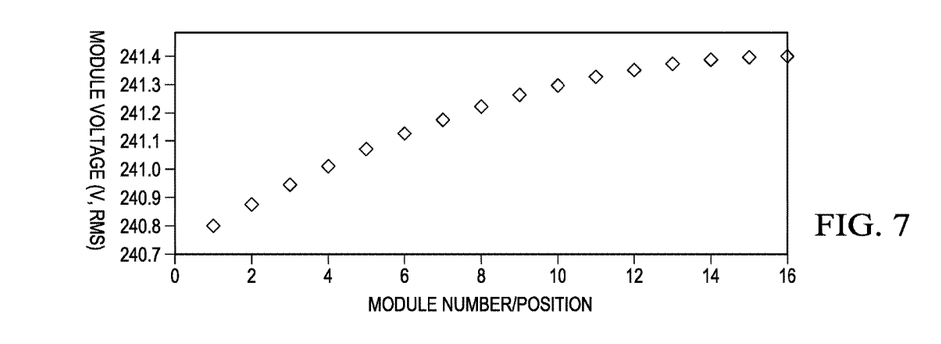
FIG. 7 illustrates a graphical representation of an embodiment of a distribution of the terminal voltages in the branch circuit of FIG. 6.

Turning now to FIG. 7 illustrated is a graphical representation of an embodiment of a distribution of the terminal voltages 606 in the branch circuit 605 of FIG. 6. The plot of a monotonic order of the terminal voltages 606 (designated "Module Voltage" in volts, root mean square ("V", RMS")) versus the position (designated "Module Number/Position") of the alternative energy source modules 604 assumes that the impedances $Z_2$ through $Z_N$ are five milliohms ("mΩ"), the impedance $Z_1$ is 50 mΩ, the grid voltage Vgrid is 240 Vrms, and the contribution current 603 of each alternative energy source module 604 is one ampere.

As apparent from FIG. 7, the terminal voltages 606 measured by, for instance, an inverter controller (see, e.g., the inverter controller 126 of FIG. 5) may be compared to infer the relative position of the alternative energy source modules 604 in the branch circuit 600. However, the contribution currents 603 from each alternative energy source module 604 are unlikely to be equal and, therefore, the actual plot of the terminal voltages 606 versus position in the branch circuit 600 will generally not be as smooth as that shown in FIG. 7. The terminal voltages 606 should, nonetheless, be monotonically increasing with position.

More generally, one can conduct a circuit analysis to determine that the relationship of the terminal voltages 606 to the contribution currents 603 and the cable impedances 601 can be expressed as a matrix equation v=Zi+$[1\ 1\ 1\ \ldots\ 1]^T$ Vrms. In this equation, "v" is a vector of the terminal voltages 606, "i" is a vector of the contribution currents 603, and Z is a matrix of impedances (e.g., cable impedances 601). During normal operation, the alternative energy source modules 604 may produce the contribution currents 603 in response to their available power (e.g., from sunlight) and in response to conditions of the power grid 610. The alternative energy source modules 604, however, can be placed into a characterization mode via commands from the inverter array gateway (see, e.g., the inverter array gateway 112 of FIG. 1). In the characterization mode, for example, the inverter array gateway may specify that a subset (perhaps just one) of alternative energy sources modules 604 is enabled while the remaining alternative energy source modules 604 are disabled. In doing so, for instance, the output current controller 510 of the inverter controller 126 (see FIG. 5) may enable the output current control of the subset of alternative energy source modules 604 and disable the output current control of the remaining alternative energy source modules 604.

In such a situation, some or all of the contribution currents 603 in the vector i may be zero. If only one contribution current 603 is enabled (or injected), then variation in the vector v may solely be due to that one contribution current 603. More specifically, if a contribution current IM for an Mth alternative energy sources module 604 is enabled (1<M<N), then one would expect to see a distribution of voltage rises in the terminal voltages 606 that are numbered V1 through VM and nearly a constant voltage in the terminal voltages 606 that are numbered VM+1 through VN. Indeed, one would expect that VM=VM+1=VM+2=...=VN since there would be substantially no current flowing in the cable impedances 601 beyond VM.

Note that the inverter controller 126 of each alternative energy source module 604 may be equipped with the output current controller that senses the local power grid line voltage $V_{LINE\_}$RMS at its output terminals, which is substantially equal to the terminal voltage 606 for a given alternative energy source module 604. Via an inverter array gateway 112, the alternative energy source modules 604 can report their measurements of the local power grid line voltage $V_{LINE\_}$RMS such that inverter array gateway becomes aware of all the terminal voltages 606. Likewise, each alternative energy source module 604 may also report other metrics such as its output power, the contribution current 603, serial number, and fault codes, if any.

By enabling one alternative energy source module 604 and collecting measurements of all the terminal voltages 606, the inverter array gateway 112 can sort the terminal voltages 606 and create a first list from least to greatest in a data structure such as a sorted position table. The inverter array gateway 112 can also sort the change in the terminal voltages 606 and create a first from least to greatest in the sorted position table. By looking at the changes rather than the absolute measurements, the inverter array gateway 112 may reduce (e.g., minimize) the effect of scaling errors due to tolerance of the measurement circuits of the alternative energy source modules 604. Such a first list from least to greatest of the sorted position table may serve as a proxy for the positions of the alternative energy source modules 604 in the branch circuit 600. It should be understood that the data structure may be embodied in other representations such as a map or graph in addition to the table discussed herein to delineate a relative position of the alternative energy source modules 604.

As noted above, if only one contribution current 603 is enabled, then some terminal voltages 606 may be substantially equal, meaning they are located "upstream" from the enabled contribution current 603. This means that in the first list from least to greatest, it is uncertain where to place such alternative energy source module 604. To further ascertain the positions of the alternative energy source modules 604 having substantially equal terminal voltages 606, one can repeat the above process for a different contribution current 603 by first disabling all alternative energy source modules 604 then enabling a contribution current 603 of one of the alternative energy source modules 604, which we will label module P, that is not in the first "M" modules from the first list from least to greatest. Likewise, a second list from least to greatest can be formed such that alternative energy source modules 604 numbered 1 through P should show a distribution of terminal voltages 606 and alternative energy source modules 604 P+1 through N should show a substantially equal terminal voltage 606. This process can be repeated as many times as necessary until a final list from least to greatest of the sorted position table has been obtained in which all the terminal voltages 606 1 through N are distributed and not substantially equal. This final list from least to greatest of the sorted position table represents the relative positions of alternative energy source modules 604 within the branch circuit 600.

The voltage measurements of the terminal voltages 606 are generally prone to some measurement error. Since the difference between any two terminal voltages 606 may be small, measurement error can cause the sorting to be inaccurate. One source of error is simply precision and drift in voltage sensors. Another source of error is that the terminal voltages 606 could be sampled at different times.

One way to correct for sensor error is to have the inverter array gateway 112 disable all the alternative energy source modules 604 and to sample all the terminal voltages 606. In this circumstance, all the terminal voltages 606 should be substantially equal as there should be no significant current flowing in the cable impedances 601. These disabled-state measurements of the terminal voltages 606 can be re-scaled or otherwise re-calibrated such that they are all substantially equal. These scaling factors may be recorded and applied to future measurements of the terminal voltages 606.

Differences in sampling times of the terminal voltages 606 can occur due to serial communications that occur between the alternative energy source modules 604 and the inverter array gateway 112. That is, the inverter array gateway 112 may "poll" the alternative energy source modules 604 during a polling cycle. If the alternative energy source modules 604 report their most recent sampling of the terminal voltages 606, they may be reporting voltages that are seconds or minutes apart in time. One way to counteract this may be to configure the inverter array gateway 112 and the alternative energy source modules 604 with a "snap" command. The snap command may be issued from the inverter array gateway 112 and broadcast to all of the alternative energy source modules 604. Upon receiving the snap command, each alternative energy storage module 604 may immediately sample its terminal voltage 606 and store it for later download. At a later time, the inverter array gateway 112 may then poll the alternative energy source modules 604 and recall the snapped voltage measurements of the terminal voltages 606. In this way, the terminal voltages 606 may be sampled at approximately the same time.

Figure 8:
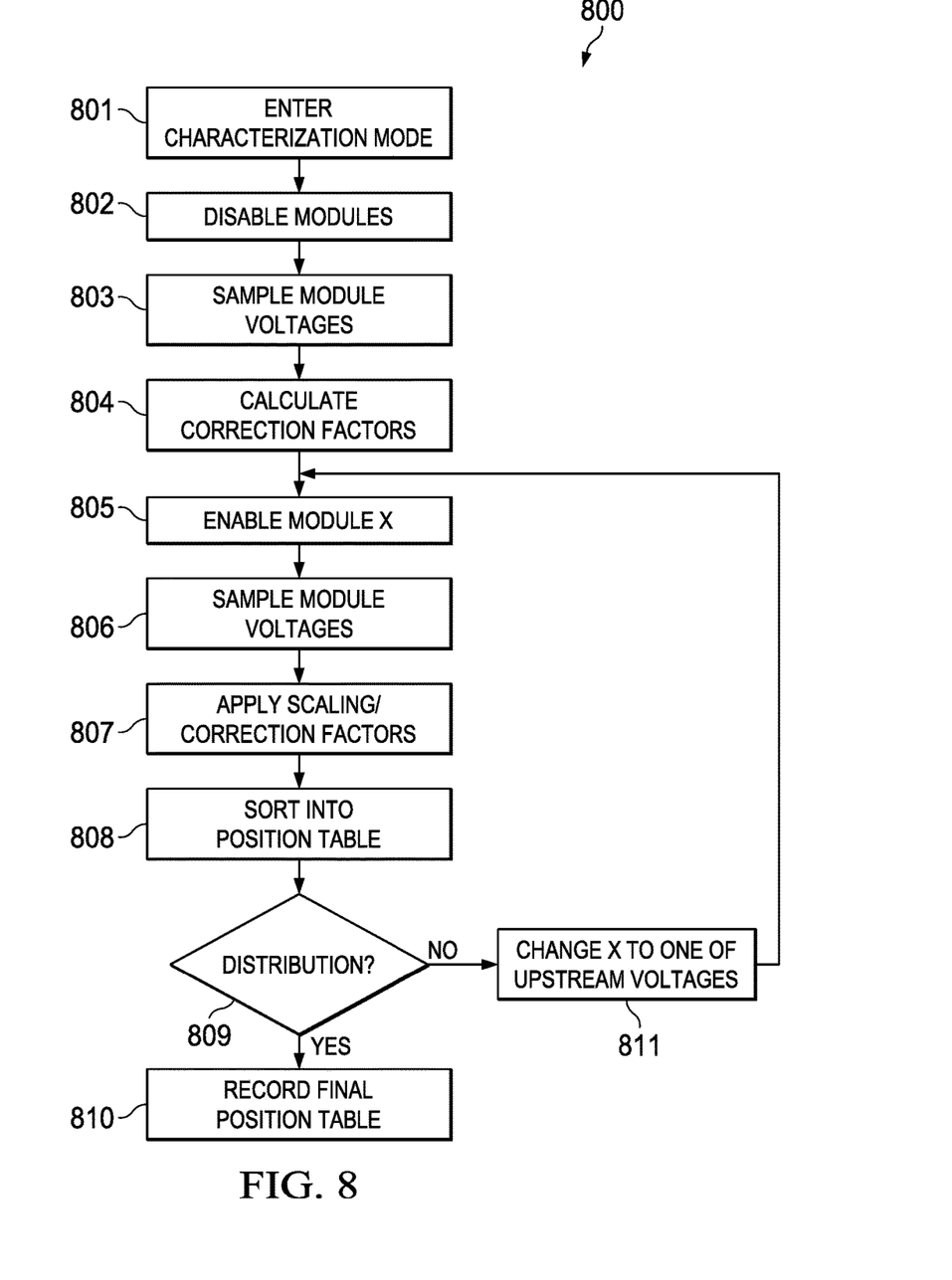
FIGS. 8 and 9 illustrate simplified flow diagrams of embodiments of methods for mapping relative positions of a plurality of alternative energy source modules.
Figure 9:
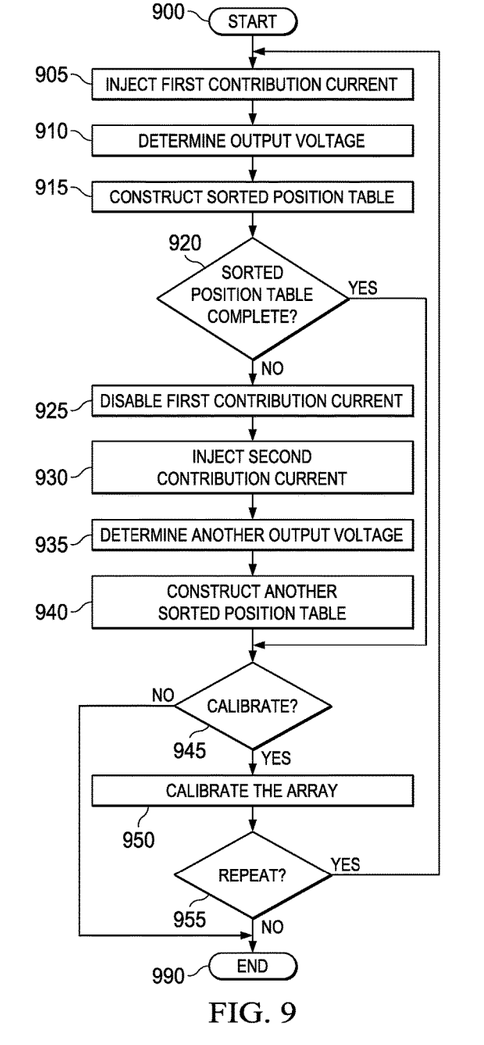

Turning now to FIGS. 8 and 9, illustrated are simplified flow diagrams of embodiments of methods for mapping relative positions of a plurality of alternative energy source modules. While the methods may be performed by an inverter array gateway, other equipment that has access to the array or to the inverter array gateway may perform the method 800 as well. Additionally, ones of the aforementioned steps of the respective methods may be omitted or re-ordered, or other steps may be added depending on the application therefor. Beginning with FIG. 8, the method 800 commences by entering a characterization mode in a step or module 801 followed by disabling the alternative energy source modules in a step or module 802. Then, the terminal (or module) voltages for the alternative energy source modules are sampled in a step or module 803, optionally using the snap technique described above. At this point, the sampled terminal voltages would ideally be equal, but due to measurement and timing errors the terminal voltages will generally only be approximately equal.

Therefore, in a step or module 804 the sampled terminal voltages are used to calculate correction factors. Then, a loop is entered wherein an alternative energy source module (designated "X") is enabled one at a time in a step or module 805. The terminal voltages are sampled in a step or module 806 and corrected, in a step or module 807, by applying a scaling/correction factor. After the correction, the terminal voltages are sorted into a data structure such as a position table from least to greatest in a step or module 808. This table forms the basis of the alternative energy source module position within a branch circuit (see, e.g., the branch circuit 600 of FIG. 6). In a decisional step or module 809, a determination is made whether the terminal voltages of the alternative energy source modules show a distribution throughout the branch circuit. For instance, does the distribution indicate that the alternative energy source module X is last in the branch circuit. If so, then the method records the final sorted position table for the alternative energy source modules in the branch circuit in a step or module 810 and the method 800 concludes. If not, then in a step or module 811, the alternative energy source module X is changed to a different value that is chosen among the non-distributed terminal voltages and the method 800 returns to the step or module 805.

Turning now to FIG. 9, the method for mapping relative positions of a plurality of alternative energy source modules begins at a start step or module 900. The method continues by injecting a first contribution current (e.g., the contribution current 603 described with respect to FIG. 6) into a power grid by a first alternative energy source module of the plurality of alternative energy source modules at a step or module 905. The method continues with determining an output voltage (e.g., the terminal voltage 606 described with respect to FIG. 6) for ones of or each of the plurality of alternative energy source modules for instance, substantially simultaneously, at a step or module 910.

The first alternative energy source module can modulate an output voltage waveform coupled to the power grid to report the output voltage for the first alternative energy source module. The first alternative energy source module can also modulate an output voltage waveform coupled to the power grid to report at least one of an output power, a serial number, a fault code and the first contribution current for the first alternative energy source module.

The method then constructs a data structure such as a sorted position table of the relative positions of the plurality of alternative energy source modules employing the output voltage for ones of or each of the plurality of alternative energy source modules in accordance with, for instance, the graphical representation of FIG. 7, in a step or module 915. An inverter array gateway (such as the inverter array gateway 112 introduced in FIG. 1) in communication with of the plurality of alternative energy source modules may construct the sorted position table. The sorted position table can provide a monotonic order of the output voltage for ones of or each of the plurality of alternative energy source modules. The sorted position table can be constructed by employing a change in the output voltage for ones of or each of the plurality of alternative energy source modules. The sorted position table may include positioning a second alternative energy source module of the plurality of alternative energy source modules upstream of the first alternative energy source module when the output voltage of the first alternative energy source module is substantially equal to the output voltage of the second alternative energy source module.

In a decisional step or module 920, the method determines if the sorted position table is complete. If the sorted position table is not complete, the method continues with disabling the first contribution current in a step or module 925 and injecting a second contribution current into the power grid by a second alternative energy source module of the plurality of alternative energy source modules in a step or module 930. In a step or module 935, the method determines another output voltage for ones of or each of the plurality of alternative energy source modules, and then constructs another sorted position table of the relative positions of the plurality of alternative energy source modules employing the another output voltage for ones of or each of the plurality of alternative energy source modules in a step or module 940.

Thereafter, or if the sorted position table is complete pursuant to the decisional step or module 920 above, the method determines if the array including the plurality of alternative energy source modules should be calibrated in a decisional step or module 945. If the array should be calibrated, the method continues by disabling the plurality of alternative energy source modules and calibrating the output voltage for the plurality of alternative energy source modules in a step or module 950. It should be noted that the calibration step can also be performed at other times within the process and often at the beginning to ensure that the plurality of alternative energy source modules are calibrated before mapping the relative positons thereof. Then, it is determined if the method should be repeated in a step or module 955. If the method should be repeated, the method returns to the step or module 905 to start over again. If the array should not be calibrated and the method should not be repeated pursuant to the decisional steps or modules 945, 955, respectively, the method is complete in an end step or module 960. It should be noted, that the method may also include detecting a failure by observing changes over time of an impedance matrix representing conductors coupling the plurality of alternative energy source modules to the power grid at any time or throughout the process described above.

Figure 10:
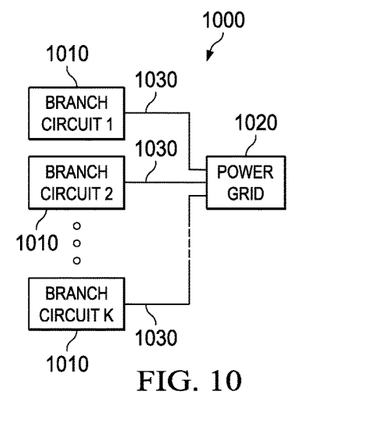
FIG. 10 illustrates a simplified block diagram of an embodiment of a plurality of branch circuits forming a multi-branch array.

Turning now to FIG. 10, illustrated is a simplified block diagram of an embodiment of a plurality of branch circuits 1010 forming a multi-branch array 1000. The multi-branch array 1000 of a plurality of branch circuits 1010 may be connected to a power grid 1020. The connections to power grid 1020 may occur via conductors such as whip cables 1030. Note that each whip cable 1030 may include a plurality of conductors (such as line 1, line 2, ground, and neutral for split-phase 240 VAC, 60-Hz power grids). The whip cables 1030 are often threaded through conduit from a rooftop to a service panel. The whip cables 1030 may include a portion of the rightmost cable impedance 601 discussed with respect to FIG. 6. Each branch circuit 1010 may effectively be connected in parallel to the power grid 1020 via ends of the whip cables 1030 and are fed with the same voltage.

The methods discussed above can be extended to the multi-branch array 1000. With reference to FIG. 6, a single branch circuit 600 may be necessarily limited by the current rating of the circuit breakers and wires involved. For example, a 20 ampere ("A") circuit breaker connected to the 240 volts alternating current ("VAC"), split-phase system may be limited to 80 percent of (20 A) (240 V) of power capability, per the U.S. National Electric Code. If each alternative energy source module 604 is rated for 240 watts ("W"), this limits each branch circuit 600 to 16 alternative energy source modules 604 that can individually provide contribution currents 603 up to one ampere each.

One of ordinary skill in the art would recognize that the approach can be extended to a plurality of branch circuits 1010 connected to the same power grid 1020. In the case of the plurality of branch circuits 1010, when a single alternative energy source module is enabled, the terminal voltages of only one branch circuit 1010 may increase. All terminal voltages not exhibiting voltage rise would be considered inhabitants of other branch circuits 1010 and can be discarded from the sorting of a first sorted position table. One need only repeat the methods for each branch circuit 1010 to fill in the sorted position tables therefor.

After obtaining the data structure such as the sorted position tables for all the branch circuits 1010, the data may be used to automatically populate a graphical user interface depicting the alternative energy source modules along with their serial numbers or other available information. The graphical user interface may be accessible from the inverter array gateway via the Internet or via direct connection thereto using a wired connection such as "Cat-5" cable, serial communications such as RS-485, and/or local wireless communications such as "Bluetooth" or "WiFi." For example, one may access the graphical user interface with a mobile phone or tablet computer via Bluetooth connections to inspect the populated array layout. Typically, through this graphical user interface, one would be able to reposition the depictions of the alternative energy source modules so that they visually line up with a known actual or desired orientation. In any case, the connections between the depictions of the alternative energy source modules are preserved per the data of the sorted position tables.

In addition to the automated array mapping method described above, further characterization of an array is possible via analysis of the measured terminal voltages. The impedance matrix Z discussed above can be calculated by utilizing power data, branch current data, and terminal voltage data. Furthermore, if it is known that at least some cable impedances are the result of prefabricated cables, then those cable impedances can be known in advance of installation. The determination of the impedance matrix Z, or specific elements thereof, can be done periodically to determine if changes are occurring in the array. Such changes could be indicative of failures of alternative energy source modules, loose connections, and the like. Information pertaining to the impedance matrix Z could be use advantageously to those conducting maintenance or repairs on the array by aiding them in isolating problems specific to some alternative energy source modules or some cable impedances. Such an analysis can be done remotely via the Internet or locally using a maintenance tool.

As a further aid in array characterization, module impedances (e.g., module impedance 602 of FIG. 6) may also be favorably utilized. In a condition wherein all alternative energy source modules are disabled, branch circuit and/or array impedances may be dominated by the relative high module impedances. Since the module impedances can be known in advance by the manufacturer, a measurement of the branch circuit impedance may be indicative of the total count of the alternative energy source modules connected to a power grid. For example, if a single module impedance is ten kilo-ohms at a given frequency, then if there are 20 alternative energy source modules in the array, one would expect to measure a total impedance of approximately 500 ohms since the impedances are approximately in parallel (neglecting the small cable impedances). If the measured impedance differs significantly from 500 ohms, in this example, then one would expect that there may be a failed connection or a failed alternative energy source module in the branch circuit. A maintenance tool may be used to provide test signals to the array or to one or more branch circuits to make the array impedance determination. Thus, the collective module impedances for a branch circuit or array may be measured via an inverter array gateway or maintenance tool, and based on the collective module impedance measurement a determination is made whether the array has a failure.

Thus, a system including an array of a plurality of alternative energy source modules (see, e.g., the array 102 of the plurality of alternative energy source modules 104 of FIG. 1) and an inverter array gateway (see, e.g., the inverter array gateway 112 of FIG. 1) has been introduced herein. In one embodiment, a first alternative energy source module may be configured to inject a first contribution current (e.g., the contribution current 603 described with respect to FIG. 6) into a power grid (e.g., the power grid 610 of FIG. 6) and determine an output voltage (e.g., the terminal voltage 606 described with respect to FIG. 6) resulting therefrom. The first alternative energy source module may be configured to determine the output voltage thereof in response to a command to the plurality of alternative energy source modules from the inverter array gateway. The first alternative energy source module may further be configured to modulate an output voltage waveform coupled to the power grid to report the output voltage for the first alternative energy source module. The first alternative energy source module may further be configured to modulate an output voltage waveform coupled to the power grid to report at least one of an output power, a serial number, a fault code or the first contribution current for the first alternative energy source module.

The inverter array gateway may be configured to receive an output voltage for ones of or each of the plurality of alternative energy source modules, and construct a data structure such as a sorted position table of relative positions of the plurality of alternative energy source modules employing the output voltage for ones of or each of the plurality of alternative energy source modules in accordance with, for instance, the graphical representation of FIG. 7. The inverter array gateway may be configured to construct the sorted position table by providing a monotonic order of the output voltage for ones of or each of the plurality of alternative energy source modules. The inverter array gateway may also be configured to construct the sorted position table by employing a change in the output voltage for ones of or each of the plurality of alternative energy source modules. The inverter array gateway may also be configured to construct the sorted position table by identifying a position of a second alternative energy source module of the plurality of alternative energy source modules upstream of the first alternative energy source module when the output voltage of the first alternative energy source module is substantially equal to the output voltage of the second alternative energy source module.

Under certain circumstances, the system may perform a second iteration to map relative positions of the plurality of alternative energy source modules. Thus, the first alternative energy source module may be configured to disable the first contribution current and a second alternative energy source module of the plurality of alternative energy source modules is configured to inject a second contribution current into the power grid and determine another output voltage resulting therefrom. The inverter array gateway may be configured to receive another output voltage for ones of or each of the plurality of alternative energy source modules and construct another sorted position table of the relative positions of the plurality of alternative energy source modules employing the another output voltage for ones of or each of the plurality of alternative energy source modules.

At any time in the process, the system can calibrate the plurality of alternative energy source modules by disabling the plurality of alternative energy source modules, and calibrating the output voltage for the plurality of alternative energy source modules. In view of fault analysis, the inverter array may also be configured to detect a failure by observing changes over time of an impedance matrix representing conductors coupling the plurality of alternative energy source modules to the power grid.

As provided herein, technologies for characterizing certain aspects of an array of alternative energy source modules are disclosed. The technologies may include determining the relative position of the alternative energy source modules in the array and characterizations of the module electrical network of the array. The technologies may also include utilizing the characterizations to diagnose failure or improper installation conditions. The technologies may further include providing data of the relative positions and characterizations to a user via an inverter array gateway that may communicate wirelessly or as wired with other computing devices or maintenance tools.

For a better understanding of power supplies, see "Modern DC-to-DC Switchmode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht, and G. C. Verghese, Addison-Wesley (1991). The aforementioned references are incorporated herein by reference in their entirety.

Also, although the present embodiments and advantages have been described in detail, it should be understood that various changes, substitutions, and alterations can be made herein without departing from the spirit and scope of the claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, claims on embodiments are intended to include within their scope such processes, machines, manufacture, compositions of matter, means, methods, or steps.

The invention claimed is:

1. A method for characterizing a system formed with a plurality of alternative energy source modules, comprising:
    enabling a first alternative energy source module of said plurality of alternative energy source modules to provide a first output current and a first output voltage;
    enabling a second alternative energy source module of said plurality of alternative energy source modules to provide a second output current and a second output voltage;
    determining a first impedance associated with said first alternative energy source module from said first output current and said first output voltage;
    determining a second impedance associated with said second alternative energy source module from said second output current and said second output voltage;
    constructing an impedance matrix from said first and second impedances; and
    assessing an operational condition of said system employing said impedance matrix.

2. The method as recited in claim 1 wherein said assessing comprises employing said impedance matrix to determine if changes are occurring in said system.

3. The method as recited in claim 1 wherein said assessing is performed periodically to determine if changes are occurring in said system.

4. The method as recited in claim 1 wherein said first and second impedances represent conductors coupling said plurality of alternative energy source modules to a power grid.

5. The method as recited in claim 1 wherein respective impedances of said plurality of alternative energy source modules including said first and second impedances provide an indication of a number of said plurality of alternative energy source modules in said system.

6. The method as recited in claim 1 wherein said first and second impedances comprise module impedances of said first and second alternative energy source modules, respectively.

7. The method as recited in claim 1 further comprising reporting a fault code for said system in accordance with assessing said operational condition.

8. The method as recited in claim 7 wherein said reporting said fault code is in response to changes over time of said impedance matrix.

9. The method as recited in claim 1 wherein said enabling said first and second alternative energy source modules is in response to a snap command.

10. The method as recited in claim 1 wherein said system is a photovoltaic system.

11. An apparatus operable with a system formed with a plurality of alternative energy source modules, comprising:
    a processor configured to:
        enable a first alternative energy source module of said plurality of alternative energy source modules to provide a first output current and a first output voltage;
        enable a second alternative energy source module of said plurality of alternative energy source modules to provide a second output current and a second output voltage;
        determine a first impedance associated with said first alternative energy source module from said first output current and said first output voltage;
        determine a second impedance associated with said second alternative energy source module from said second output current and said second output voltage;
        construct an impedance matrix from said first and second impedances; and
        assess an operational condition of said system employing said impedance matrix.

12. The apparatus as recited in claim 11 wherein said processor is configured to assess said operational condition by employing said impedance matrix to determine if changes are occurring in said system.

13. The apparatus as recited in claim 11 wherein said processor is configured to assess said operational condition periodically to determine if changes are occurring in said system.

14. The apparatus as recited in claim 11 wherein said first and second impedances represent conductors coupling said plurality of alternative energy source modules to a power grid.

15. The apparatus as recited in claim 11 wherein said processor is configured to provide an indication of a number of said plurality of alternative energy source modules in said system based on respective impedances of said plurality of alternative energy source modules including said first and second impedances.

16. The apparatus as recited in claim 11 wherein said first and second impedances comprise module impedances of said first and second alternative energy source modules, respectively.

17. The apparatus as recited in claim 11 wherein said processor is configured to report a fault code for said system in accordance with assessing said operational condition.

18. The apparatus as recited in claim 17 wherein said processor is configured to report said fault code in response to changes over time of said impedance matrix.

19. The apparatus as recited in claim 11 wherein said processor is configured to enable said first and second alternative energy source modules is in response to a snap command.

20. The apparatus as recited in claim 11 wherein said system is a photovoltaic system.

* * * * *